(12) United States Patent
Liu et al.

(10) Patent No.: US 11,511,513 B2
(45) Date of Patent: Nov. 29, 2022

(54) DISPLAY SUBSTRATE MOTHERBOARD, MANUFACTURING METHOD AND CUTTING METHOD THEREOF, DISPLAY SUBSTRATE AND DISPLAY DEVICE

(71) Applicant: BOE TECHNOLOGY GROUP CO., LTD., Beijing (CN)

(72) Inventors: Lu Liu, Beijing (CN); Pao Ming Tsai, Beijing (CN); Shuang Du, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 487 days.

(21) Appl. No.: 16/489,441

(22) PCT Filed: Feb. 28, 2019

(86) PCT No.: PCT/CN2019/076486
§ 371 (c)(1),
(2) Date: Aug. 28, 2019

(87) PCT Pub. No.: WO2019/233136
PCT Pub. Date: Dec. 12, 2019

(65) Prior Publication Data
US 2021/0362467 A1 Nov. 25, 2021

(30) Foreign Application Priority Data

Jun. 4, 2018 (CN) .......................... 201810564551.9

(51) Int. Cl.
*B32B 7/023* (2019.01)
*B23K 26/38* (2014.01)
(Continued)

(52) U.S. Cl.
CPC .............. *B32B 7/023* (2019.01); *B23K 26/38* (2013.01); *B32B 7/12* (2013.01); *B32B 37/12* (2013.01);
(Continued)

(58) Field of Classification Search
CPC ........... B32B 7/023; B32B 7/12; B32B 37/12; B32B 37/182; B32B 38/0004;
(Continued)

(56) References Cited

U.S. PATENT DOCUMENTS

2011/0236681 A1* 9/2011 Kim .................... B32B 37/12
428/343
2013/0182413 A1* 7/2013 Shin .................... F21V 11/00
362/235
(Continued)

FOREIGN PATENT DOCUMENTS

| CN | 101276083 A | 10/2008 |
| CN | 103207480 A | 7/2013 |

(Continued)

OTHER PUBLICATIONS

International Search Report of PCT/CN2019/076486 in Chinese, dated Apr. 23, 2019, with English translation.

*Primary Examiner* — Michael Zhang
(74) *Attorney, Agent, or Firm* — Collard & Roe, P.C.

(57) ABSTRACT

Embodiments of the present disclosure provide a display substrate motherboard and a manufacturing method and a cutting method thereof, a display substrate and a display device. The display substrate motherboard includes a preset cutting position, a back film and an adhesive layer disposed on the back film, the adhesive layer includes: a first adhesive layer corresponding to the preset cutting position; a second adhesive layer disposed on two sides of the first adhesive layer in a direction parallel to the back film; and a first light (Continued)

blocking layer disposed between the first adhesive layer and the second adhesive layer, wherein the first light blocking layer is configured to reduce light entering the second adhesive layer through the first light blocking layer after being incident from the first adhesive layer.

17 Claims, 3 Drawing Sheets

(51) Int. Cl.
  *B32B 7/12* (2006.01)
  *B32B 37/12* (2006.01)
  *B32B 37/18* (2006.01)
  *B32B 38/00* (2006.01)

(52) U.S. Cl.
  CPC ........ *B32B 37/182* (2013.01); *B32B 38/0004* (2013.01); *B32B 2307/416* (2013.01); *B32B 2310/0843* (2013.01); *B32B 2457/20* (2013.01)

(58) Field of Classification Search
  CPC ...... B32B 2307/416; B32B 2310/0843; B32B 2457/20; B23K 26/38; G02F 1/133351; G09F 9/30
  See application file for complete search history.

(56) References Cited

U.S. PATENT DOCUMENTS

| | | | |
|---|---|---|---|
| 2015/0327361 | A1 | 11/2015 | Wang et al. |
| 2016/0306221 | A1 | 10/2016 | Wang |
| 2021/0026046 | A1* | 1/2021 | Shim ...................... G02B 5/003 |
| 2021/0223613 | A1* | 7/2021 | Lee ................... G02F 1/133345 |

FOREIGN PATENT DOCUMENTS

| | | |
|---|---|---|
| CN | 103995385 A | 8/2014 |
| CN | 104741796 A | 7/2015 |
| CN | 107634031 A | 1/2018 |
| CN | 108717832 A | 10/2018 |
| JP | 2009-122386 A | 6/2009 |
| KR | 10-2012-0076708 A | 7/2012 |

* cited by examiner

DISPLAY SUBSTRATE MOTHERBOARD, MANUFACTURING METHOD AND CUTTING METHOD THEREOF, DISPLAY SUBSTRATE AND DISPLAY DEVICE

CROSS REFERENCE TO RELATED APPLICATIONS

This application is the National Stage of PCT/CN2019/076486 filed on Feb. 28, 2019, which claims priority under 35 U.S.C. § 119 of Chinese Application No. 201810564551.9 filed on Jun. 4, 2018, the disclosure of which is incorporated by reference.

TECHNICAL FIELD

Embodiments of the present disclosure relate to a display substrate motherboard, a manufacturing method and a cutting method thereof, a display substrate and a display device.

BACKGROUND

A display substrate motherboard belongs to a multi-layer film structure, the existing display substrate motherboard usually includes film layers, such as a protective film, a display layer, a base substrate, a back film and the like, and after the aforementioned film layer process is completed, the display substrate motherboard is required to be cut using laser.

A line width of the laser cutting directly affects a frame width of a display substrate, but the existing laser cutting has a wide line width, which cannot meet the process requirements of the narrow frame of the display substrate.

SUMMARY

Embodiments of the present disclosure provide a display substrate motherboard and a manufacturing method and a cutting method thereof, a display substrate and a display device.

According to an aspect of the present disclosure, a display substrate motherboard is provided, the display substrate motherboard includes a preset cutting position, a back film and an adhesive layer disposed on the back film, the adhesive layer includes a first adhesive layer corresponding to the preset cutting position, a second adhesive layer disposed on two sides of the first adhesive layer in a direction parallel to the back film and a first light blocking layer disposed between the first adhesive layer and the second adhesive layer, the first light blocking layer is configured to reduce light entering the second adhesive layer through the first light blocking layer after being incident from the first adhesive layer.

For example, the first light blocking layer is a first reflecting layer, and the first light reflecting layer has an optically denser medium characteristic compared to the first adhesive layer and the second adhesive layer.

For example, the first adhesive layer has an optically denser medium characteristic compared to the second adhesive layer.

For example, the display substrate motherboard further includes a second light blocking layer between the second adhesive layer and the back film, the second light blocking layer has an optically denser medium characteristic compared to the first adhesive layer and the second adhesive layer.

For example, the first light reflecting layer and the second light blocking layer on an identical side of the first adhesive layer in the direction parallel to the back film are an integral structure.

For example, in the direction parallel to the back film, a plurality of the first adhesive layers are disposed to be spaced from each other at an interval, and the plurality of the first adhesive layers respectively correspond to a plurality of the preset cutting positions.

For example, the display substrate motherboard further includes a second light blocking layer disposed between the second adhesive layer and the back film, the second light blocking layer and the first light blocking layer between adjacent the first adhesive layers are formed as an integral structure.

For example, the display substrate motherboard further includes a base substrate, a display member layer and a protective film sequentially disposed on a side of the adhesive layer opposite to the back film, starting from the adhesive layer.

According to an aspect of the present disclosure, a manufacturing method of a display substrate motherboard is provided, the method includes the following steps of: disposing a back film; forming a first adhesive layer on an upper surface of the back film, the first adhesive layer corresponding to a preset cutting position; forming a first light blocking layer at a sidewall of the first adhesive layer in a direction parallel to the back film; in the direction parallel to the back film, forming a second adhesive layer at a side of the first light blocking layer opposite to the first adhesive layer on an upper surface of the back film, the first light blocking layer is sandwiched between the first adhesive layer and the second adhesive layer, the first light blocking layer is configured to reduce light entering the second adhesive layer through the first light blocking layer after being incident from the first adhesive layer.

For example, the manufacturing method of the display substrate motherboard further includes: disposing a base substrate at a side of the adhesive layer away from the back film; disposing a display member layer at a side of the base substrate away from the back film; and disposing a protective film at a side of the display member layer away from the back film.

For example, the first adhesive layer is configured to have an optically denser medium characteristic compared to the second adhesive layer, the first light blocking layer is a first light reflecting layer, and the first light reflecting layer has an optically denser medium characteristic compared to the first adhesive layer and the second adhesive layer.

For example, the first light reflecting layer is formed by sputtering using a plasma enhanced chemical vapor deposition method.

For example, between the forming the first adhesive layer and the forming the first light blocking layer, the manufacturing method of the display substrate motherboard further includes: forming a protective layer at a side of the first adhesive layer away from the back film; between the forming the first light blocking layer and the forming the second adhesive layer, the method further includes removing the protective layer.

For example, during the forming the first light blocking layer at a sidewall of the first adhesive layer in a direction parallel to the back film, the manufacturing method of the display substrate motherboard further simultaneously comprises forming the second light blocking layer at a region of the upper surface of the back film where the first adhesive layer and the first light blocking layer are not formed; the forming the second adhesive layer at a side of the first light blocking layer opposite to the first adhesive layer on an upper surface of the back film in the direction parallel to the back film includes forming the second adhesive layer on a side of the second light blocking layer opposite to the back film and at a region of the upper surface of the back film where the first adhesive layer and the first light blocking layer are not formed, the first light blocking layer and the second light blocking layer are an integral structure, the second light blocking layer is located between the back film and the second adhesive layer, and the second light blocking layer has an optically denser medium characteristic compared to the first adhesive layer and the second adhesive layer.

According to an aspect of the present disclosure, a cutting method of a display substrate motherboard is provided, which is used for cutting the above described display substrate motherboard, the method includes cutting the display substrate motherboard at the preset cutting position and in a direction perpendicular to the display substrate motherboard by utilizing a laser.

According to an aspect of the present disclosure, a display substrate obtained by the above described cutting method is provided. The display substrate includes a display region and a non-display region, a back film, an adhesive layer disposed on the back film, the adhesive layer comprises a first adhesive layer located in the non-display region, a second adhesive layer disposed at a side of the first adhesive layer facing the display region in a direction parallel to the back film and a first light blocking layer disposed between the first adhesive layer and the second adhesive layer, the first light blocking layer is configured to reduce light entering the second adhesive layer through the first light blocking layer after being incident from the first adhesive layer.

For example, the first adhesive layer corresponds to a frame region of the display substrate, and the first light blocking layer has an optically denser medium characteristic compared to the first adhesive layer and the second adhesive layer, the first adhesive layer has an optically denser medium characteristic compared to the second adhesive layer.

For example, the display substrate further includes a second light blocking layer between the second adhesive layer and the back film, the second light blocking layer has an optically denser medium characteristic compared to the first adhesive layer and the second adhesive layer, and the second light blocking layer and the first light blocking layer are an integral structure.

For example, the display substrate further includes: a base substrate disposed at a side of the adhesive layer away from the back film, a display member layer disposed at a side of the base substrate away from the back film and a protective film disposed at a side of the display member layer away from the back film.

According to an aspect of the present disclosure, a display device is provided, the display device includes the above described display substrate.

BRIEF DESCRIPTION OF THE DRAWINGS

The above and/or additional aspects and advantages of the present disclosure will become apparent and readily understood comprehended, in which.

DESCRIPTION OF THE EMBODIMENTS

Figure 1:
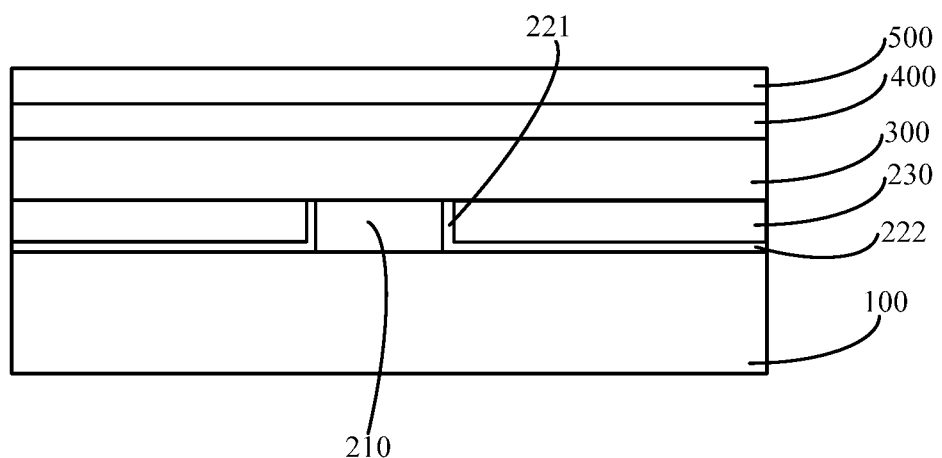
FIG. 1 is a structural schematic illustration of of a display substrate motherboard according to an exemplary embodiment.

Embodiments of the present disclosure are described in detail below, and the examples of the embodiments are illustrated in the figures, in which the same or similar reference numerals indicate the same or similar elements or elements having the same or similar functions. The embodiments described below with reference to the figures are exemplary, which are only intended to be explained the present disclosure, but not to be construed as a limiting of the present disclosure.

In description of the present disclosure, the description with reference to terms "one embodiment", "some embodiments", "example", "specific example", or "some examples" and the like means the specific features described in conjunction with the embodiment(s) or example(s). A structure, material or feature is included in at least one embodiment or example of the present disclosure. In the specification, the schematic representation of the above terms is not necessarily directed to the same embodiment or example. Furthermore, the particular features, structures, materials, or characteristics described may be combined in a suitable manner in any one or more embodiments or examples. In addition, it is possible for those skilled in the art to conjunction and combine various embodiments or examples described in the specification, as well as features of various embodiments or examples.

Moreover, terms "first" and "second" are only used for descriptive purposes, and are not to be construed as indicating or implying a relative importance or implicitly indicating the number of technical features indicated. Thus, features defining "first" and "second" may either explicitly or implicitly include at least one features. In description of the present disclosure, the meaning of "a plurality of" is two or more, unless explicitly and specifically defined otherwise.

A light source for laser cutting mainly includes two kinds of lasers, i.e., carbon dioxide ($CO_2$) laser and UV laser. The $CO_2$ laser mainly depends on heat melting to achieve a cutting of a film layer, and a width of the cutting line usually is more than 200 μm. The UV laser has a short laser wavelength and a short laser pulse time, which in some extent can reduce the cutting line width, however, the cutting line width thereof is still between 100 μm and 150 μm.

Referring to FIG. 1, a schematic illustration of structure of a display substrate motherboard proposed by the present disclosure is representatively shown, showing a laminated structure of a display substrate motherboard. In the exemplary embodiment, the display substrate motherboard proposed by the present disclosure is illustrated by taking a device laminated structure of a flexible display substrate to be cut as an example. It is readily understood by those skilled in the art that, in order to apply related designs of the present disclosure into other similar display substrate motherboards, various modifications, additions, substitutions, deletions, or other changes are made to the specific embodiments described below, and these variations are still within a scope of principle of the display substrate motherboard proposed by the present disclosure.

In this embodiment, the display substrate motherboard proposed by the present disclosure includes: a preset cutting position; a back film 100; an adhesive layer disposed on the back film 100, the adhesive layer including a first adhesive layer corresponding to the preset cutting position and a second adhesive layer disposed on two sides of the first adhesive layer in a direction parallel to the back film 100; and a first light blocking layer disposed between the first adhesive layer and the second adhesive layer, in which the first light blocking layer is configured to reduce light entering the second adhesive layer through the first light blocking layer after being incident from the first adhesive layer.

For example, the display substrate motherboard further includes a base substrate, a display member layer, and a protective film, which are sequentially disposed on a side of the adhesive layer opposite to the back film starting from the adhesive layer.

As shown in FIG. 1, the display substrate motherboard proposed by the present disclosure mainly includes a back film 100, an adhesive layer, a base substrate 300, a display member layer 400, and a protective film 500, which are disposed in a laminated manner. A connecting manner and functional relationship of main layer structures of the display substrate motherboard proposed by the present disclosure is described in detail below with reference to the accompanying drawings.

As shown in FIG. 1, in this embodiment, structures and manufacturing processes and the like of the back film 100, the base substrate 300, the display member layer 400 and the protective film 500 all may be referred to a layer-like structure of the existing display substrate motherboard, and will not be repeated here. Furthermore, an optionally particular manufacturing process of a part of the layer structures will be illustrated in detail in the following embodiments regarding the manufacturing process of the display substrate motherboard.

For example, the first light blocking layer is a first light reflecting layer.

As shown in FIG. 1, in this embodiment, the adhesive layer mainly includes a first adhesive layer 210 and a second adhesive layer 230 disposed at two sides of the first adhesive layer in a direction parallel to the back film, for example, the second adhesive layer 230 disposed adjacent to both two sides of the first adhesive layer 210, separately. That is, the first adhesive layer 210 has an optically denser medium characteristic compared to the second adhesive layer 230, and a first light reflecting layer 221 is disposed between the first adhesive layer 210 and the second adhesive layer 230, the first light reflecting layer 221 has an optically denser medium characteristic compared to the first adhesive layer 210 and the second adhesive layer 230. That is, in a horizontal direction in which the adhesive layer is located, in other words, in a direction parallel to the back film 100, the first light reflecting layer 221 at both sides of the first adhesive layer 210 separates the first adhesive layer 210 from the second adhesive layer 230 at both sides thereof. When the display substrate motherboard having the above structures is subjected to laser cutting, a laser head 600 may be disposed a position above the first adhesive layer 210, to emit laser to the first adhesive layer 210 for cutting.

Figure 6:
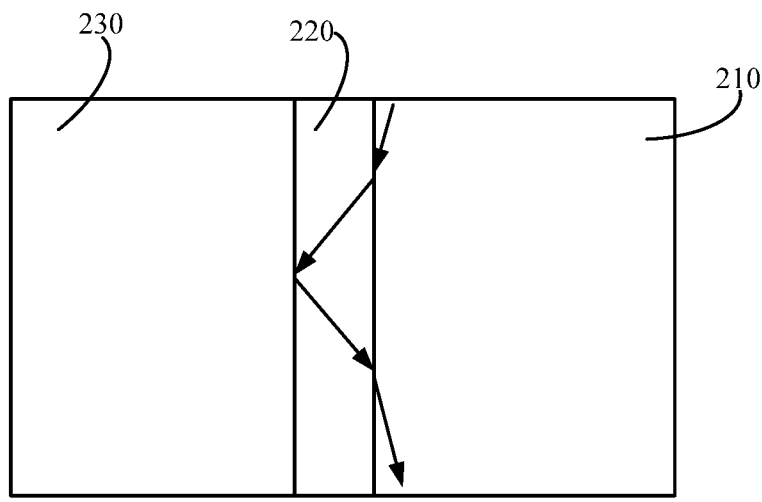
FIG. 6 is a schematic illustration of a laser propagation path of the display substrate motherboard shown in FIG. 1 in a cutting process thereof.

In a laser cutting process of the display substrate motherboard, the heat influence of the laser cutting on each of film layers of the base substrate is mainly reflected on an adhesive, especially the adhesive formed on the back film, the adhesive formed on the back film is most evidently influenced by heat. Because the above adhesive is comparably sensitive to heat, heat influence has a wide range, resulting in a further increase of the overall cutting line width. Referring to FIG. 6, FIG. 6 representatively shows a schematic illustration of a laser propagation path in a display substrate motherboard capable of embodying a principle of the present disclosure in a cutting process thereof. According to this, since the first light reflecting layer 221 can reflect all the light incident from the first adhesive layer 210 back to the first adhesive layer 210, the aforementioned light cannot enter into the second adhesive layer 230, thereby by forming a total reflection layer (i.e., the first light reflecting layer 221) at the adhesive layer on the back film 100, the cutting line width can be controlled, and the cutting line width of the display substrate motherboard can be great decreased. Furthermore, because a directionality of the cutting laser is strong and an incident angle is large in the cutting process of the display substrate motherboard, by using the so-called "total reflection layer" in the above-mentioned content and by means of the above design of the present disclosure, a total reflection effect of the cutting laser can be achieved.

It should be noted that, in other embodiments, the first light reflecting layer 221 in the embodiment may also be replaced by another form of design, and acts as the first light blocking layer disposed between the first adhesive layer 210 and the second adhesive layer 230. Herein, the first light blocking layer can reduce the cutting light entering the second adhesive layer 230 through the light blocking layer after being incident from the first adhesive layer 210, that is, reduce the influence of the cutting light on the second adhesive layer 230, thereby achieving effects of controlling of the cutting line width. In other words, a design of the light reflecting layer, for example, the first light reflecting layer or the second light reflecting layer below, is one of the exemplary solutions. For example, the first light blocking layer or the second light blocking layer may also be configured as a light absorbing layer that is capable of absorbing light and formed by a light absorbing material, and then after the cutting light is incident into the light absorbing layer through the first adhesive layer 210, at least a portion of the cutting light is absorbed by the light absorbing layer, so that it reduces the light that is incident into the second adhesive layer 230 through the light absorbing layer. In addition, when a non-reflective layer such as the light absorbing layer is used as the first light blocking layer or the second light blocking layer, optically denser or optically thinner medium relationships among the first light blocking layer, the second light blocking layer, the first adhesive layer 210 and the second adhesive layer 230 are not limited to the above-described comparative relationship of the present embodiment.

As shown in FIG. 1, in the embodiment, a second light blocking layer 222 may be further disposed between the second adhesive layer 230 and the back film 100, and the second light blocking layer 222 has an optically denser medium characteristic compared to both the first adhesive layer 210 and the second adhesive layer 230. Accordingly, by means of the design of the second light blocking layer 222, the second adhesive layer 230, which is used as an adhesive layer of a display panel after the cutting, can be separated from the back film 100, further ensuring that the laser line in the process of cutting does not enter the second adhesive layer 230 from a direction of the back film 100, thereby cooperating with the first adhesive layer 210 to further reduce the cutting line width of the display substrate motherboard. In other embodiments, only the first light reflecting layer 221 may also be disposed, while the second adhesive layer 230 may be directly disposed on the back film 100.

For example, the second light blocking layer may be a second light reflecting layer.

Further, in the embodiment, the second light blocking layer 222 may adopt the same material and manufacturing process as the first light reflecting layer 221, and the second light blocking layer 222 and the first light reflecting layer 221 may be integrally formed in the same process step, so that the first light reflecting layer 221 and the second light blocking layer 222 commonly form a light reflecting layer with an integral structure. In other embodiments, materials of the first light reflecting layer 221 and the second light blocking layer 222 may also not be the same, and are only required to ensure that each has an optically denser medium characteristic compared to the first adhesive layer 210 and the second adhesive layer 230. In addition, the first light reflecting layer 221 and the second light blocking layer 222 may also adopt different manufacturing processes, and are not limited to the embodiment.

It should be noted that the structure of the display substrate motherboard shown in FIG. 1 is only a laminated structure near one cutting position when the display substrate motherboard is used as a flexible display substrate to be cut. That is, the display substrate motherboard may include a plurality of first adhesive layers 210, these first adhesive layers 210 are distributed at intervals in a horizontal direction, and the plurality of first adhesive layers 210 respectively correspond to a plurality of preset cutting positions of the display substrate motherboard, there is the second adhesive layer 230 disposed between adjacent first adhesive layers 210, that is, the display substrate motherboard is provided with the second adhesive layer 230 at all positions between the back film 100 and the base substrate 300 where the first adhesive layer 210 is not disposed. Furthermore, the present embodiment will be explained by taking that a total reflection layer (including the first light reflecting layer 221 and the second light blocking layer 222) is formed at an adhesive layer on the back film 100 as an example. In other embodiments, according to different requirements, the above-mentioned design of the total reflection layer may be applied to the adhesive layer at other laminated positions of the display substrate motherboard, which still conforms to the concept principle of the present disclosure.

For example, the first light blocking layer and the second light blocking layer between the adjacent first adhesive layers are formed as an integral structure, that is, the first light blocking layer and the second light blocking layer both between the second adhesive layer and the back film and between the first adhesive layers are a continuous structure, for example, a concave structure.

It should be noted herein that the display substrate motherboards showed in the figures and described in this specification are just a few examples of many kinds of the display substrate motherboards that can employ the principles of the present disclosure. It should be clearly understood that the principles of the present disclosure are definitely not limited to any detail of the display substrate motherboard shown in the figures or described in this specification or any components of the display substrate motherboard.

An embodiment of a manufacturing method of a display substrate motherboard is exemplarily described below.

In the present embodiment, a manufacturing method of a display substrate motherboard proposed in the present disclosure will be illustrated. It will be readily understood by those skilled in the art that in order to apply the related design of the present disclosure to the manufacturing process of other similar display substrate motherboards, various modifications, additions, substitutions, deletions or other variations are made to specific embodiments described below. These variations are still within the scope of the principles of the manufacturing method of a display substrate motherboard proposed by the present disclosure.

Figure 2:
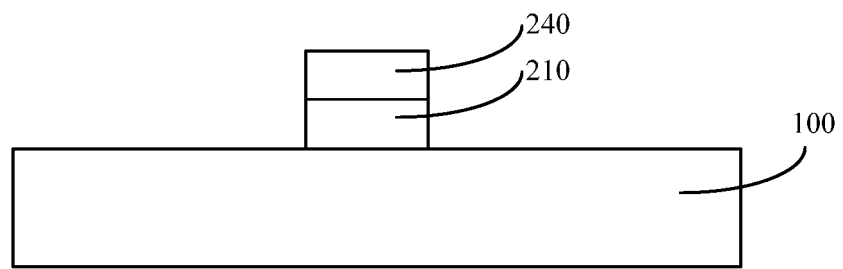
FIG. 2 is a structural schematic illustration of the display substrate motherboard shown in FIG. 1 in a step of a manufacturing process thereof.
Figure 3:
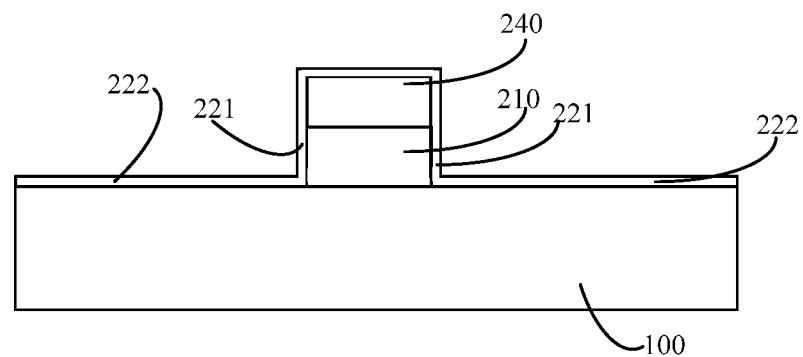
FIG. 3 is a structural schematic illustration of the display substrate motherboard shown in FIG. 1 in another step of a manufacturing process thereof.
Figure 4:
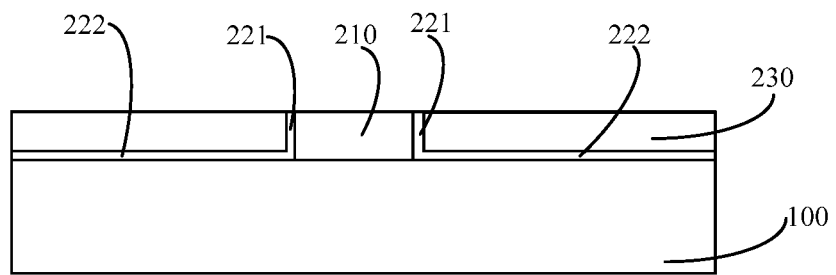
FIG. 4 is a structural schematic illustration of the display substrate motherboard shown in FIG. 1 in yet another step of a manufacturing process thereof.

Referring to FIG. 2 to FIG. 4, FIG. 2 representatively shows a structural schematic illustration of the substrate motherboard in a step of a manufacturing process thereof; FIG. 3 representatively shows a structural schematic illustration of the substrate motherboard in another step of a manufacturing process thereof; FIG. 4 representatively shows a structural schematic illustration of the substrate motherboard in yet another step of a manufacturing process thereof. A process, material selection and other special design of each step in the manufacturing method of the display substrate motherboard proposed by the present disclosure will be described in detail in combination with the above drawings as following.

As shown in FIG. 2 to FIG. 4, in the embodiment, the manufacturing method of the display substrate motherboard proposed by the present disclosure mainly includes the following steps:

disposing a back film 100 (as shown in FIG. 2);

forming a first adhesive layer 210 on an upper surface of the back film 100 at a position corresponding to a preset cutting position (as shown in FIG. 2);

forming a first light blocking layer at a sidewall of the first adhesive layer 210 (as shown in FIG. 3);

forming a second adhesive layer at a side of the first light blocking layer opposite to the first adhesive layer on an upper surface of the back film in a direction parallel to the back film, the first light blocking layer disposed between the first adhesive layer and the second adhesive layer, the first light blocking layer configured to reduce light entering the second adhesive layer through the first light blocking layer after incident from the first adhesive layer.

For example, the second adhesive layer 230 and the first adhesive layer 210 commonly form an adhesive layer and are separated by the first light blocking layer, and the first light blocking layer has an optically denser medium characteristic compared to the adhesive layer (as shown in FIG. 4).

For example, the manufacturing method of the display substrate motherboard further includes:

disposing a base substrate 300 at a side of the adhesive layer away from the back film 100 (as shown in FIG. 1);

disposing a display member layer 400 at a side of the base substrate 300 away from the back film 100 (as shown in FIG. 1);

disposing a protective film 500 at a side of the display member layer 400 away from the back film 100 (as shown in FIG. 1).

So far, referring to FIG. 1, in the display substrate motherboard manufactured by the above manufacturing method of the display substrate motherboard, the adhesive layer is further divided into a first adhesive layer 210 and a second adhesive layer 230 respectively disposed at two sides of the first adhesive layer 210 and being adjacent to the first adhesive layer 210. The first adhesive layer 210 and the second adhesive layer 230 are separated by the first light blocking layer, and the first light blocking layer may be understood as the first light reflecting layer 221 in the above embodiment. Since the light reflecting layer has an optically denser medium characteristic compared to the first adhesive layer 210 and the second adhesive layer 230, when the display substrate motherboard is subjected to laser cutting, a laser head 600 may be disposed at a position above the first adhesive layer 210 to emit laser to the first adhesive layer 210 for cutting. Therefore, the total reflection effect of the light reflecting layer ensures that light does not enter into the second adhesive layer 230, thereby greatly reducing the cutting line width of the display substrate motherboard.

It should be noted that, in other embodiments, steps of disposing the first light blocking layer and the second light blocking layer (i.e., the first light reflecting layer 221 and the second light blocking layer 222) in the embodiment may also be substituted by other forms of design, as steps of disposing the first light blocking layer between the first adhesive layer 210 and the second adhesive layer 230. The first light blocking layer can reduce the cutting light entering the second adhesive layer 230 through the first light blocking layer after incident from the first adhesive layer 210, that is, it reduce the influence of the cutting light on the second adhesive layer 230, thereby achieving effect of controlling the cutting line width. In other words, the step of disposing the light reflecting layer belongs to one alternative solution of the above-described step of disposing the first light blocking layer. For example, the first light blocking layer may also be configured as a light absorbing layer capable of absorbing light and formed by a light absorbing material, and after the cutting light is incident into the light absorbing layer through the first adhesive layer 210, and at least a portion of the cutting light is absorbed by the light absorbing layer, thereby reducing the cutting light that is incident on the second light adhesive layer 230 through the light absorbing layer. In addition, when a non-reflective layer such as a light absorbing layer is used as the first light blocking layer, optically denser or optically thinner medium relationships among the first light blocking layer, the first adhesive layer 210 and the second adhesive layer 230 are not limited to the above-described comparative relationship of the present embodiment.

For example, the first adhesive layer is configured to have an optically denser medium characteristic compared to the second adhesive layer, and the first light blocking layer is a first light reflecting layer, and the first light reflecting layer has an optically denser medium characteristic compared to both the first adhesive layer and the second adhesive layer.

For example, the first light blocking layer may be formed by sputtering using a plasma enhanced chemical vapor deposition method.

Further, as shown in FIG. 2 and FIG. 3, in the embodiment, between the step of forming the first adhesive layer 210 and the step of forming the first light blocking layer, a step of forming a protective layer 240 on the first adhesive layer 210 is further included. The arrangement of the protective layer 240 can prevent a light blocking material from sputtered to a surface of the first adhesive layer 210 away from the back film 100 in a sputtering process of the first light blocking layer. Accordingly, between the step of forming the light reflecting layer and the step of forming the second adhesive layer 230, a step of removing the above protective layer 240 is further included. Taking a protective film as the protective layer 240 as an example, removing the protective layer 240 may be understood as tearing off the protective film.

For example, in a direction parallel to the back film, when the first light blocking layer is formed at the sidewall of the first adhesive layer, the manufacturing method further includes: forming the second light blocking layer at a region of an upper surface of the back film where the first adhesive layer and the first light blocking layer are not formed; forming the second adhesive layer at a side of the first light blocking layer opposite to the first adhesive layer on the upper surface of the back film in a direction parallel to the back film further includes: forming the second adhesive layer at a side of the second light blocking layer opposite to the back film and at a region of the upper surface of the back film where the first adhesive layer and the first light blocking layer are not formed, in which the first light blocking layer and the second light blocking layer are in an integral structure, in which the second light blocking layer is located between the back film and the second adhesive layer, the second light blocking layer has an optically denser medium characteristic compared to the first adhesive layer and the second adhesive layer.

As shown in FIG. 1 and FIG. 3, in the embodiment, the forming the first light blocking layer may be forming the first light blocking layer on sidewalls of two sides of the first adhesive layer 210, and forming the second light blocking layer at a region of the upper surface of the back film 100 where the first adhesive layer 210 is not disposed, and forming the second adhesive layer 230 on the second light blocking layer. By means of the above steps, the second light blocking layer is also formed between the second adhesive layer 230 and the back film 100, and the second light blocking layer may be understood as the second light blocking layer 222 in the above embodiment. However, in other embodiments of the manufacturing method of a display substrate motherboard proposed by the present disclosure, the second light blocking layer at the above two positions is not limited to a simultaneous formation process in the embodiment. By means of a design of the second light blocking layer 222, the second adhesive layer 230, which is used as the adhesive layer of a display panel after the cutting, can be separated from the back film 100, further ensuring that the laser line in the process of cutting is not incident into the second adhesive layer 230 from a direction of the back film 100, thereby cooperating with the first adhesive layer 210 to further reduce the cutting line width of the display substrate motherboard. In other embodiments, only the step of forming the first light reflecting layer 221 may also be retained.

It should be noted herein that the manufacturing methods of the display substrate motherboard shown in the drawings and described in the specification are just a few examples of the many manufacturing methods that can employ the principles of the present disclosure. It should be clearly understood that the principles of the present disclosure are not limited to any detail or any step of the manufacturing method of the display substrate motherboard shown in the drawings or described in the specification.

Hereinafter, an embodiment of a cutting method of the displaying substrate motherboard will be described.

In the embodiment, the cutting method of the displaying substrate motherboard proposed in the present disclosure will be illustrated.

In the embodiment, the cutting method of the display substrate motherboard proposed by the present disclosure may be used for cutting the display substrate motherboard proposed in the present disclosure and illustrated in detail in the above embodiments. It is readily understood by those skilled in the art that in order to apply the related design of the cutting method to the cutting process of other embodiments of the display substrate motherboards proposed by the present disclosure, various modifications, additions, substitutions, deletions or other variations are made to specific embodiments described below. These variations are still within the scope of the principles of the cutting method of a display substrate motherboard proposed by the present disclosure.

Figure 5:
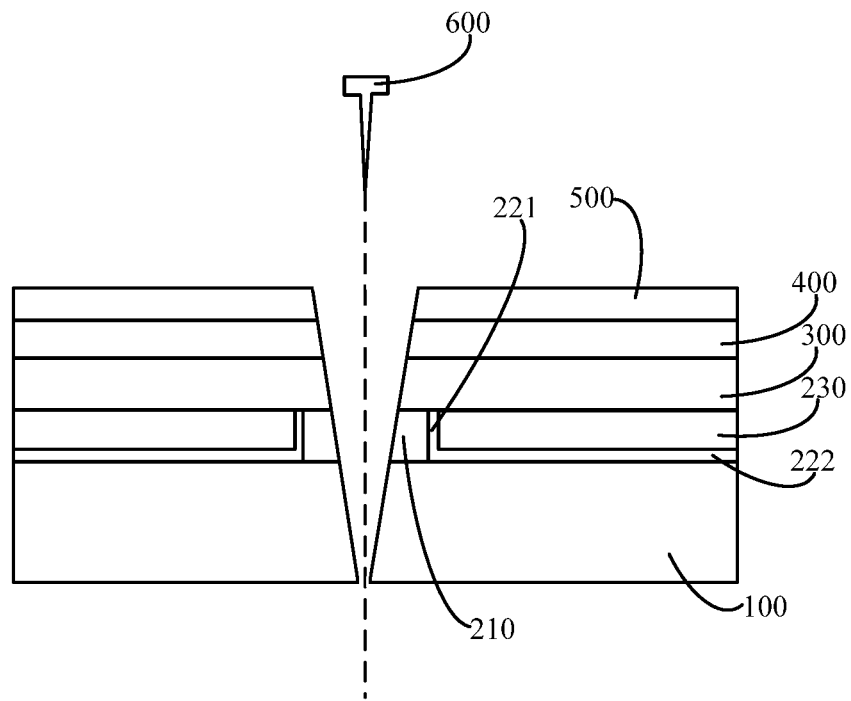
FIG. 5 is a structural schematic illustration of the display substrate motherboard shown in FIG. 1 in a cutting process thereof.

Referring to FIG. 5, a structural schematic illustration of the display substrate motherboard in its cutting process is representatively shown in FIG. 5. Hereinafter, a process of each step of the cutting method the display substrate motherboard proposed by the present disclosure will be illustrated in detail in combination with the above drawings.

As shown in FIG. 5, in the embodiment, the cutting method of the display substrate motherboard proposed by the present disclosure mainly includes the following steps:

configuring a laser cutting device and placing a display substrate motherboard in the laser cutting device;

adjusting a position of the display substrate motherboard so that the first adhesive layer 210 of the display substrate motherboard is directly below a laser head 600;

cutting the display substrate motherboard using a laser emitted from the laser head 600.

Accordingly, based on the special design of the display substrate motherboard proposed by the present disclosure and illustrated in detail in the above embodiments, the laser head 600 emits light to a cutting region of the display substrate motherboard directly below (i.e., a region corresponding to the first adhesive layer 210). When entering the adhesive layer, the cutting light is incident to the first adhesive layer 210, then are attenuated (for example, partially reflected or partially absorbed) by the first light blocking layer, and then enter the second adhesive layer 230, or are completely blocked (e.g., totally reflected or totally absorbed) by the first light blocking layer and no light enters the second adhesive layer 230. Accordingly, by means of the display substrate cut by the above cutting method, because the second adhesive layer 230 of the display substrate is less affected, or is completely unaffected by the cutting light, the display substrate motherboard has a smaller cutting line width, thereby realizing a narrow frame design of the display substrate.

It should be noted herein that the cutting methods of the display substrate motherboard shown in the drawings and described in the specification are just a few examples of the many cutting methods that can employ the principles of the present disclosure. It should be clearly understood that the principles of the present disclosure are not limited to any detail or any step of the cutting method of the display substrate motherboard shown in the drawings or described in this specification.

Hereinafter, an embodiment of a display substrate is described.

In the embodiment, a display substrate proposed by the present disclosure will be illustrated.

In the embodiment, the display substrate provided by the present disclosure includes a display region and a non-display region, and mainly includes a back film, an adhesive layer, a base substrate, a display member layer, and a protective film laminated with each other. The adhesive layer includes a second adhesive layer and a first adhesive layer disposed at two sides of the second adhesive layer and adjacent to the second adhesive layer, the first adhesive layer corresponds to a frame region of the display substrate, and the first light blocking layer is disposed between the first adhesive layer and the second adhesive layer, and the first light blocking layer is configured to reduce light entering the second adhesive layer through the first light blocking layer after incident from the first adhesive layer.

Further, the display substrate may be a display substrate obtained by cutting the display substrate motherboard provided by the present disclosure using the cutting method of the display substrate motherboard proposed by the present disclosure. Accordingly, with reference to FIG. 5, taking the light reflecting layer as the first light blocking layer and the second light blocking layer as an example, because the first adhesive layer 210 and the second adhesive layer 230 of the display substrate motherboard are separated by the light reflecting layer, and the light reflecting layer has an optically denser medium characteristic compared to both the first adhesive layer 210 and the second adhesive layer 230, when the laser head 600 is disposed at a position above the first adhesive layer 210 and emit the laser to the first adhesive layer 210 for cutting, the reflective layer with the total reflection function can ensure that the light does not enter the second adhesive layer 230, thereby greatly reducing the cutting line width of the display substrate motherboard, and thus achieving the effect of reducing the frame width of the display substrate after cutting and satisfying the process requirements of the narrow frame of the display substrate.

It should be noted herein that the display substrates showed in the drawings and described in this specification are just a few examples of the many kinds of display substrates that can employ the principles of the present disclosure. It should be clearly understood that the principles of the present disclosure are not limited to any detail of the display substrate or any component of the display substrate shown in the drawings or described in this specification.

An Embodiment of a Display Device

In the embodiment, a display device proposed by the present disclosure will be illustrated.

Among them, the present disclosure proposes a display device including a display substrate proposed by the present disclosure and exemplarily illustrated in the above embodiments.

In summary, the present disclosure proposes a display substrate motherboard and a manufacturing method thereof. By a design that "an adhesive layer is divided into a first adhesive layer and a second adhesive layer, and the first adhesive layer corresponds to a preset cutting position of the display substrate motherboard, and the first light blocking layer is disposed between the first adhesive layer and the second adhesive layer", in a cutting process of the display substrate motherboard, when cutting light is incident to the first adhesive layer from above, the first light blocking layer can reduce the incident cutting light entering the second adhesive layer through the first light blocking layer, that is, the influence of the cutting light on the second adhesive layer is reduced, thereby achieving an effect of controlling the cutting line width.

Further, in an embodiment of the present disclosure, when it adopts a design that "the first light blocking layer is the first light reflecting layer, the first adhesive layer has an optically denser medium characteristic compared to the second adhesive layer, and the first light reflecting layer has an optically denser medium characteristic compared to both the first adhesive layer and the second adhesive layer", in a cutting process of the display substrate motherboard, the cutting laser can be reflected back to the first adhesive layer by utilizing the first reflective layer, without influences on the second adhesive layer on two sides of the first adhesive layer, further reducing the cutting line width of the display substrate motherboard.

The exemplary embodiments of the display substrate motherboard, the manufacturing method and the cutting method thereof, the display substrate and the display device are described and/or illustrated in detail above. However, embodiments of the present disclosure are not limited to the specific embodiments described herein, in contrast, the constitutions and/or steps of each embodiment can be used independently and separately from the other constitutions and/or steps described herein. Each constitution and/or each step of one embodiment may also be used in combination with other components and/or steps of other embodiments. When introducing elements/constitutions and the like described and/or illustrated herein, terms "a", "an" and "the" are used to indicate presence of one or more elements/constitutions. Terms "comprising", "including" and "having" are used to indicate an inclusive meaning that are included and are meant that there are also additional elements/constitutions/and the like in addition to the listed elements/constitutions/and the like. Terms "first" and "second" and the like in the claims and the description are used merely as reference numerals, without numerical limitations of the object.

Although the display substrate motherboard and the manufacturing method and cutting method thereof, the display substrate and the display device have been described in accordance with various specific embodiments, it will be recognized for those skilled in the art that the embodiments of the present disclosure can be modified within the spirit and scope of the claims.

The present application claims a priority of Chinese Patent Application No. 201810564551.9, filed on Jun. 4, 2018, the content of which is cited by the full text as a part of this application.

What is claimed is:

1. A display substrate motherboard, comprising:
    a preset cutting position;
    a back film; and
    an adhesive layer, disposed on the back film, the adhesive layer comprising:
        a first adhesive layer, corresponding to the preset cutting position;
        a second adhesive layer, disposed on two sides of the first adhesive layer in a direction parallel to the back film; and
        a first light blocking layer, disposed between the first adhesive layer and the second adhesive layer,
    wherein the first light blocking layer is configured to reduce light entering the second adhesive layer through the first light blocking layer after being incident from the first adhesive layer,
    wherein the display substrate motherboard further comprises: a second light blocking layer between the second adhesive layer and the back film, the second light blocking layer has an optically denser medium characteristic compared to the first adhesive layer and the second adhesive layer,
    wherein the first light blocking layer and the second light blocking layer are an integral structure.

2. The display substrate motherboard according to claim 1, wherein the first light blocking layer is a first light reflecting layer, and the first light reflecting layer has an optically denser medium characteristic compared to the first adhesive layer and the second adhesive layer.

3. The display substrate motherboard according to claim 2, wherein the first adhesive layer has an optically denser medium characteristic compared to the second adhesive layer.

4. The display substrate motherboard according to claim 1, wherein the first light reflecting layer and the second light blocking layer on an identical side of the first adhesive layer in the direction parallel to the back film are an integral structure.

5. The display substrate motherboard according to claim 1, wherein in the direction parallel to the back film, a plurality of the first adhesive layers are disposed to be spaced from each other at an interval, and the plurality of the first adhesive layers respectively correspond to a plurality of the preset cutting positions.

6. The display substrate motherboard according to claim 5, further comprising: a second light blocking layer disposed between the second adhesive layer and the back film, wherein the second light blocking layer and the first light blocking layer between adjacent the first adhesive layers are formed as an integral structure.

7. The display substrate motherboard according to claim 1, further comprising: a base substrate, a display member layer and a protective film sequentially disposed on a side of the adhesive layer opposite to the back film, starting from the adhesive layer.

8. A manufacturing method of a display substrate motherboard, comprising the following steps of:
    disposing a back film;
    forming a first adhesive layer on an upper surface of the back film, the first adhesive layer corresponding to a preset cutting position;
    forming a first light blocking layer at a sidewall of the first adhesive layer in a direction parallel to the back film;
    in the direction parallel to the back film, forming a second adhesive layer at a side of the first light blocking layer opposite to the first adhesive layer on an upper surface of the back film, wherein the first light blocking layer is sandwiched between the first adhesive layer and the second adhesive layer, the first light blocking layer is configured to reduce light entering the second adhesive layer through the first light blocking layer after being incident from the first adhesive layer,
    wherein during the forming the first light blocking layer at a sidewall of the first adhesive layer in a direction parallel to the back film, the manufacturing method further simultaneously comprises:
    forming a second light blocking layer at a region of the upper surface of the back film where the first adhesive layer and the first light blocking layer are not formed;
    the forming the second adhesive layer at a side of the first light blocking layer opposite to the first adhesive layer on an upper surface of the back film in the direction parallel to the back film including:
    forming the second adhesive layer on a side of the second light blocking layer opposite to the back film and at a region of the upper surface of the back film where the first adhesive layer and the first light blocking layer are not formed, wherein the first light blocking layer and the second light blocking layer are an integral structure,
    wherein the second light blocking layer is located between the back film and the second adhesive layer, and the second light blocking layer has an optically denser medium characteristic compared to the first adhesive layer and the second adhesive layer,
    wherein the first light blocking layer and the second light blocking layer are an integral structure.

9. The manufacturing method of the display substrate motherboard according to claim 8, further comprising:
- disposing a base substrate at sides of the first adhesive layer and the second adhesive layer away from the back film;
- disposing a display member layer at a side of the base substrate away from the back film; and
- disposing a protective film at a side of the display member layer away from the back film.

10. The manufacturing method of the display substrate motherboard according to claim 8, wherein the first adhesive layer is configured to have an optically denser medium characteristic compared to the second adhesive layer, and the first light blocking layer is a first light reflecting layer, and the first light reflecting layer has an optically denser medium characteristic compared to the first adhesive layer and the second adhesive layer.

11. The manufacturing method of the display substrate motherboard according to claim 8, wherein the first light reflecting layer is formed by sputtering using a plasma enhanced chemical vapor deposition method.

12. The manufacturing method of a display substrate motherboard according to claim 8, wherein between the forming the first adhesive layer and the forming the first light blocking layer, the method further comprises:
- forming a protective layer at a side of the first adhesive layer away from the back film;
- between the forming the first light blocking layer and the forming the second adhesive layer, the method further comprising:
- removing the protective layer.

13. A cutting method of a display substrate motherboard for cutting the display substrate motherboard according to claim 1, comprising:
- cutting the display substrate motherboard at the preset cutting position and in a direction perpendicular to the display substrate motherboard by utilizing a laser.

14. A display substrate obtained by the cutting method according to claim 13, comprising:
- a display region and a non-display region;
- a back film;
- an adhesive layer, disposed on the back film, the adhesive layer comprising:
  - a first adhesive layer, located in the non-display region;
  - a second adhesive layer, disposed at a side of the first adhesive layer facing the display region in a direction parallel to the back film; and
  - a first light blocking layer, disposed between the first adhesive layer and the second adhesive layer;
- wherein the first light blocking layer is configured to reduce light entering the second adhesive layer through the first light blocking layer after being incident from the first adhesive layer,
- wherein the display substrate further comprises: a second light blocking layer between the second adhesive layer and the back film, the second light blocking layer has an optically denser medium characteristic compared to the first adhesive layer and the second adhesive layer, and the second light blocking layer and the first light blocking layer are an integral structure.

15. The display substrate according to claim 14, wherein the first adhesive layer corresponds to a frame region of the display substrate, and the first light blocking layer has an optically denser medium characteristic compared to the first adhesive layer and the second adhesive layer, the first adhesive layer has an optically denser medium characteristic compared to the second adhesive layer.

16. The display substrate according to claim 14, further comprising:
- a base substrate, disposed at a side of the adhesive layer away from the back film;
- a display member layer, disposed at a side of the base substrate away from the back film; and
- a protective film, disposed at a side of the display member layer away from the back film.

17. A display device comprising the display substrate of claim 14.

* * * * *